(12) United States Patent
Jeong et al.

(10) Patent No.: US 11,485,859 B2
(45) Date of Patent: Nov. 1, 2022

(54) POLYIMIDE FILM FOR FLEXIBLE DISPLAY DEVICE SUBSTRATE

(71) Applicant: LG CHEM, LTD., Seoul (KR)

(72) Inventors: Hye Won Jeong, Daejeon (KR); Chan Hyo Park, Daejeon (KR); Jinho Lee, Daejeon (KR); Jinyoung Park, Daejeon (KR); Kyunghwan Kim, Daejeon (KR); Ye Ji Hong, Daejeon (KR); Danbi Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 392 days.

(21) Appl. No.: 16/617,858

(22) PCT Filed: Aug. 27, 2018

(86) PCT No.: PCT/KR2018/009818
§ 371 (c)(1),
(2) Date: Nov. 27, 2019

(87) PCT Pub. No.: WO2019/045376
PCT Pub. Date: Mar. 7, 2019

(65) Prior Publication Data
US 2020/0165452 A1 May 28, 2020

(30) Foreign Application Priority Data

Sep. 4, 2017 (KR) .......................... 10-2017-0112323
Dec. 14, 2017 (KR) .......................... 10-2017-0172005

(51) Int. Cl.
*C08L 79/08* (2006.01)
*C08G 73/10* (2006.01)

(52) U.S. Cl.
CPC .......... *C08L 79/08* (2013.01); *C08G 73/1014* (2013.01); *C08L 2201/10* (2013.01); *C08L 2203/16* (2013.01); *C08L 2203/20* (2013.01)

(58) Field of Classification Search
CPC ... C09D 179/08; C08L 79/08; C08G 73/1071; C08G 73/10; C08G 73/1067; C08J 2379/08
See application file for complete search history.

(56) References Cited

U.S. PATENT DOCUMENTS

| | | | |
|---|---|---|---|
| 5,115,090 A | 5/1992 | Sachdev et al. | |
| 5,171,828 A | 12/1992 | Meterko et al. | |
| 8,859,186 B2 | 10/2014 | Sakayori | |
| 9,706,649 B2 | 7/2017 | Jung et al. | |
| 9,975,997 B2 | 5/2018 | Jeon et al. | |
| 10,508,175 B2 | 12/2019 | Choi et al. | |
| 2004/0132900 A1* | 7/2004 | Sachdev | C08G 73/1075 427/140 |
| 2008/0044639 A1 | 2/2008 | Chan et al. | |
| 2008/0044684 A1 | 2/2008 | Chan et al. | |
| 2012/0235071 A1* | 9/2012 | Moralez | C08G 73/1014 524/404 |
| 2012/0241005 A1 | 9/2012 | Yamaguchi et al. | |
| 2013/0279126 A1 | 10/2013 | Chen et al. | |
| 2013/0289202 A1 | 10/2013 | Miyazaki et al. | |
| 2015/0210048 A1* | 7/2015 | Jeong | H01L 51/0024 428/212 |
| 2016/0204365 A1* | 7/2016 | Choi | H01L 51/56 264/2.7 |

FOREIGN PATENT DOCUMENTS

| | | |
|---|---|---|
| CN | 102712768 A | 10/2012 |
| CN | 103374130 A | 10/2013 |
| EP | 2 502 955 A1 | 9/2012 |
| JP | 1992-224824 A | 8/1992 |
| JP | H06-49405 A | 2/1994 |
| JP | 3323337 B2 | 9/2002 |
| JP | 2008-239930 A | 10/2008 |
| JP | 5428180 B2 | 2/2014 |
| JP | 2016-188367 A | 11/2016 |
| JP | 6115727 B2 | 4/2017 |
| KR | 10-2012-0073909 A | 7/2012 |
| KR | 10-2012-0096005 A | 8/2012 |
| KR | 10-2012-0113718 A | 10/2012 |
| KR | 10-1240955 B1 | 3/2013 |
| KR | 10-2014-0004655 A | 1/2014 |
| KR | 10-2016-0067413 A | 6/2016 |
| KR | 10-2016-0094551 A | 8/2016 |
| KR | 10-2016-0095801 A | 8/2016 |
| KR | 10-2016-0118962 A | 10/2016 |
| KR | 10-2017-0069190 A | 6/2017 |
| TW | 201132676 A | 10/2011 |
| TW | 201202305 A | 1/2012 |
| WO | 2011-062271 A1 | 5/2011 |
| WO | 2011056634 A2 | 5/2011 |
| WO | 2011-108542 A1 | 9/2011 |
| WO | 2016-084777 A1 | 6/2016 |

OTHER PUBLICATIONS

International Search Report Issued for PCT Application No. PCT/KR208/009818 dated Dec. 7, 2018, 3 pages.
European Search Report issued for European Application No. 18 852 591.9 dated Oct. 27, 2020, 8 pages.

* cited by examiner

*Primary Examiner* — Gregory Listvoyb
(74) *Attorney, Agent, or Firm* — Rothwell, Figg, Ernst & Manbeck, P.C.

(57) ABSTRACT

A polyimide film according to the present invention can be effectively used as a substrate for a flexible display device without a deterioration in heat resistance even at a temperature of 350° C. or higher since a coefficient of thermal expansion (A) in the section of 100-350° C., of the polyimide film, and a coefficient of thermal expansion (B) in the section of 350-450° C., of the polyimide film, meet $0<B/A<2$.

10 Claims, 1 Drawing Sheet

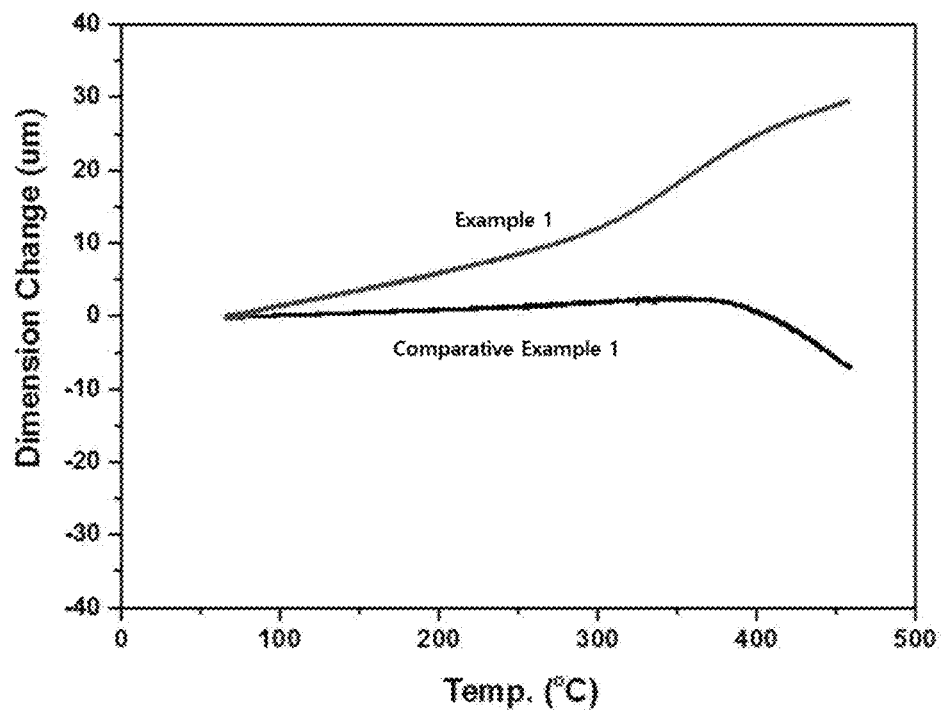

POLYIMIDE FILM FOR FLEXIBLE DISPLAY DEVICE SUBSTRATE

This application is a 35 U.S.C. 371 National Phase Entry Application from PCT/KR2018/009818, filed Aug. 27, 2018, which claims the benefit of priority to Korean Patent Application No. 10-2017-0112323, filed on Sep. 4, 2017, and Korean Patent Application No. 10-2017-0172005, filed on Dec. 14, 2017, the entire disclosures of which are incorporated herein by reference.

TECHNICAL FIELD

The present invention relates to a polyimide film for a flexible display device substrate, which has low residual stress and improved transparency, and a method of preparing same.

BACKGROUND ART

Polyimide (PI) is a polymer having relatively low crystallinity or substantially amorphous structure, and it has advantages such as simple synthesis process, easy process to make a thin film, and no need of cross-linkable moieties for curing, as well as excellent polymeric properties such as transparency, thermal and chemical resistance, mechanical and electrical properties, and dimensional stability due to its rigid chain structure. Polyimide is now widely used as an electrical and electronical material for the field of car and aerospace, a flexible circuit board, a liquid crystal alignment film for LCD, an adhesive as well as a coating agent.

Particularly, polyimide has great attention as a material for flexible display substrates as it is a high performance polymer with excellent thermal stability, mechanical properties, chemical resistance and electrical properties. In order to be used for a display device, polyimide should be transparent and its coefficient of thermal expansion (CTE) should not be a negative value at a temperature of 350° C. or higher so as to lower defect rate caused by residual stress of substrates during heat treatment in the preparation of display devices. Therefore, there are many studies to minimize the change of optical properties and thermal history while maintaining the basic properties of polyimide.

Flexible displays are increasingly in demand due to their free form factor, and lightweight, thin and unbreakable characteristics. In order to implement such a flexible display, a polyimide having excellent heat resistance, BPDA (3,3', 4,4'-Biphenyltetracarboxylic dianhydride)-PDA (phenylene diamine) polyimide is typically used.

A polyimide for a substrate is obtained by polymerization of a diamine monomer and a dianhydride monomer, the diamine being in a relatively excessive amount is known to be favorable in terms of stability of viscosity and molecular weight. However, when the substrate is prepared from a polyimide containing an excessive amount of diamine, it has a negative value of CTE at a temperature of 350° C. or higher and undergoes shrinkage at a high temperature and transparency deterioration due to an amine ending group on curing at a temperature of 450° C. or higher. Also, the negative value of CTE results in residual stress during heat treatment of a TFT process to cause various defects such as film lifting.

DETAILED DESCRIPTION OF THE INVENTION

The present invention is designed to solve the technical problem of the related art, and thus, it is an aspect of the present invention to provide a polyimide film having improved transparency without causing shrinkage even in a high temperature process.

It is other aspect of the present invention to provide a method of preparing the polyimide film.

It is another aspect of the present invention to provide a flexible display device comprising the polyimide film as a substrate.

In order to accomplish the above aspect, the present invention provides a polyimide film, which has a coefficient of thermal expansion (A) at a range of 100 to 350° C. and a coefficient of thermal expansion (B) at a range of 350 to 450° C. satisfying the relation of 0<B/A<2.

In one embodiment, the polyimide film may have a coefficient of thermal expansion (A) at a range of 100 to 350° C. and a coefficient of thermal expansion (B) at a range of 350 to 450° C. satisfying the relation of 0<B−A<1.

In one embodiment, the polyimide film may be made by curing a polyimide precursor solution at a final curing temperature of 450° C. or higher.

In one embodiment, the polyimide film may be prepared from a polyimide obtained by polymerizing less than 1 mol of 3,3',4,4'-biphenylcarboxylic dianhydride (s-BPDA) with respect to 1 mol of 4,4'-paraphenylenediamine (pPDA), and end-capping with addition of an end-capping agent comprising phthalic anhydride (PA), and may have a positive value of CTE at a temperature ranging from 350° C. or higher.

In one embodiment, the molar ratio of 3,3',4,4'-biphenylcarboxylic dianhydride (s-BPDA) and 4,4'-paraphenylenediamine (pPDA) may range from 0.98:1 to 0.99:1.

In one embodiment, the polyimide film may have a transparency of 70% or more.

In one embodiment, the end-capping agent comprising PA may be added in an amount of 0.02 to 0.025 mol based on 1 mol of pPDA.

In one embodiment, the polyimide film may have a CTE of 0 to 7 ppmP/C which is measured for the polyimide film brought into a second heating from 50° C. to 450° C. after first heating and cooling thereof.

In order to accomplish the other aspect, the present invention also provides a method of preparing a polyimide film for a flexible display device substrate, comprising:

adding polymeric components comprising less than 1 mol of 3,3',4,4'-biphenylcarboxylic dianhydride (s-BPDA) with respect to 1 mol of 4,4'-paraphenylenediamine (pPDA), and an end-capping agent comprising phthalic anhydride (PA) in a polymerization solvent to prepare a polyimide precursor:

dissolving the polyimide precursor in an organic solvent to obtain a polyimide precursor solution;

coating the polyimide precursor solution on a substrate; and bringing the coated polyimide precursor solution into drying and heating to prepare a polyimide film.

In one embodiment, the polyimide precursor solution may be cured during the drying and heating and its final curing temperature may be 450° C. or higher.

In order to accomplish another aspect, the present invention further provides a flexible display device comprising the polyimide film as a display substrate.

Advantageous Effects

The present invention provides a polyimide film which has a positive value of CTE (coefficient of thermal expansion) without deterioration of heat-resistance at a temperature of 350° C. or higher and shows stable CTE behaviors due to a smaller difference between its low temperature and high temperature CTEs. Further, the polyimide film having high transparency is useful as a substrate for display devices since it allows easy preparation of a TFT device through an align key.

BRIEF DESCRIPTION OF THE DRAWINGS

FIG. 1 shows the results of thermal expansion change at the temperature range of 100 to 460° C. for polyimide films prepared in Example 1 and Comparative Example 1.

BEST MODE

Hereinafter, the present invention will be described in detail with reference to the accompanying drawings which illustrate a preferable example of the present invention for the purpose of better explanation, not intended to limit the technical scope of the invention. It will be obvious to those skilled in the art that various changes and modifications may be made without departing from the spirit and scope of the invention. In the following description, well-known functions or constructions would not be described in detail if they may obscure the point of the invention.

The present invention relates to a polyimide film without thermal shrinkage at a high temperature.

The present invention provides a polyimide film, which has a coefficient of thermal expansion (A) at a range of 100 to 350° C. and a coefficient of thermal expansion (B) at a range of 350 to 450° C. satisfying the relation of 0<B/A<2.

In one embodiment, the polyimide film may have a coefficient of thermal expansion (A) at a range of 100 to 350° C. and a coefficient of thermal expansion (B) at a range of 350 to 450° C. satisfying the relation of 0<B−A<1.

If B/A>2 or B−A>1, it means that the difference between the CTE at a low temperature and the CTE at a high temperature is large. The polyimide film of the present invention is characterized in that both of the low and high temperature CTEs are positive, and the difference therebetween is small. That is, due to the small difference, the polyimide film of the present invention can show stable expansion characteristics during the variation of process temperatures, thereby enhancing process stability and reducing product defects.

In a preferred embodiment, the value of B/A may be 0.5 or more, 0.8 or more, or 1 or more, and may be 1.8 or less or 1.5 or less. Also, the value of B−A may be 0.1 or more or 0.3 or more, and may be 0.9 or less or 0.8 or less.

The coefficient of thermal expansion may be measured for a 10/I-thick polyimide film prepared at a temperature of 400° C. or higher. In one embodiment, the film is prepared by curing a polyimide precursor solution at a final curing temperature of 450° C. or higher.

In one embodiment, the polyimide film of the present invention may be prepared from a polyimide obtained by polymerizing less than 1 mol of 3,3',4,4'-biphenylcarboxylic dianhydride (s-BPDA) with respect to 1 mol of 4,4'-paraphenylenediamine (pPDA), and end-capping with addition of an end-capping agent comprising phthalic anhydride (PA).

Particularly, the polyimide film of the present invention may have a positive value of CTE at a temperature ranging from 350° C. or higher.

Typically, the polyimide is prepared by using an excessive amount of diamine so as to obtain a polyimide precursor solution having a stable viscosity and molecular weight to improve the properties of a polyimide film prepared therefrom. However, the use of diamine in an excessive amount induces a negative value of CTE at a high temperature to deteriorate thermal stability.

Particularly, upon preparing an excessive diamine-contained polyimide substrate using N-methyl-2-pyrrolidone (NMP) as a solvent, this may show a negative value (shrinkage behavior) of CTE at a high temperature and also may undergo transparency deterioration on curing at a temperature of 450° C. or higher due to an amine ending group. Also, the polyimide film prepared by using NMP may show a negative value of CTE measured with TMA at a temperature of 350° C. or higher, which results in residual stress during heat treatment at a high temperature of a TFT process to cause various defects such as cracks of an inorganic film or film lifting.

In order to solve these problems, the present inventors have been endeavored to provide a polyimide film having improved thermal stability and enhanced mechanical properties.

According to one embodiment of the present invention, there is provided a polyimide film having a positive value of CTE at a high temperature of 350° C. or higher by using a phthalic anhydride (PA) for end-capping of the main chain and conducting final curing at a high temperature of 400° C. or higher, preferably 450° C. or higher even when the diamine is added in an excessive amount. That is, the polyimide of the present invention does not undergo shrinkage at a high temperature.

In one embodiment, the molar ratio of 3,3',4,4'-biphenylcarboxylic dianhydride (s-BPDA) and 4,4'-paraphenylenediamine (pPDA) may range from 0.98:1 to 0.99:1, preferably 0.9875:1 to 0.9890:1.

Also, further use of phthalic anhydride (PA) as an end-capping agent together with s-BPDA and pPDA can improve heat-resistance and transparency. PA may be added in an amount of 0.02 to 0.025 mol, preferably 0.022 to 0.025 mol based on 1 mol of pPDA.

The polyimide of the present invention may have a positive value of CTE measured with a thermomechanical analyzer (TMA) at a high temperature of 350° C. or higher, in which the polyimide film is brought into a second heating from 100° C. to 460° C. after first heating and cooling thereof. Preferably, the CTE may be 0 to 7 ppm PC, more preferably 0 to 6 ppm PC.

The end-capping of polyimide obtained from the diamine and the tetracarboxylic dianhydride may be carried out by adding the end-capping agent for continuous reaction after the reaction of the tetracarboxylic dianhydride and the diamine, by adding the tetracarboxylic dianhydride for continuous reaction after the reaction of a dicarboxylic anhydride-based end-capping agent with the diamine, or by simultaneously adding the tetracarboxylic dianhydride, the diamine and the end-capping agent.

The end-capped polyimide precursor may be subject to polymerization.

The polymerization of the polyimide precursor may be carried out by conventional polymerization methods such as solution polymerization.

The reaction of polymerization may be carried out under anhydrous conditions at a temperature of −75 to 50° C., preferably 0 to 40° C. The diamine compound is dissolved in an organic solvent, to which an acid dianhydride is added. The diamine compound and the acid dianhydride is contained in an amount of about 10 to 30 wt % in the polymerization solvent, and their molecular weight may be controlled according to the polymerization time and reaction temperature.

Also, the solvent which may be used in the polymerization may be selected from the group consisting ketones such as γ-butyrolactone, 1,3-dimethyl-imidazolidinone, methyl ethyl ketone, cyclohexanone, cyclopentanone, and 4-hydroxy-4-methyl-2-pentanone; aromatic hydrocarbons such as toluene, xylene, and tetramethylbenzene; glycol ethers (Cellosolve) such as ethylene glycol monoethylether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, and triethylene glycol monoethyl ether, ethyl acetate, butyl acetate, ethylene glycol monoethyl etheracetate, ethylene glycol monobutyl etheracetate, diethylene glycol monoethyl etheracetate, dipropylene glycol monomethyl etheracetate, ethanol, propanol, ethyleneglycol, propyleneglycol, carbitol, dimethylacetamide (DMAc), N,N-diethylacetamide, dimethylformamide (DMF), diethylformamide (DEF), N,N-dimethylacetamide (DMAc), N-methyl pyrrolidone (NMP), N-ethylpyrrolidone (NEP), N-vinylpyrrolidone, 1,3-dimethyl-2-imidazolydinone, N,N-dimethylmethoxy acetamide, dimethylsulfoxide, pyridine, dimethylsulfone, hexamethyl phosphoamide, tetramethyl urea, N-methyl caprolactam, tetrahyrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether, dimethyl propionamide, diethyl propionamide and a mixture thereof.

Preferably, sulfoxide-based solvents such as dimethylsulfoxide, diethylsulfoxide and the like; formamide-based solvents such as N,N-dimethylformamide, N,N-diethylformamide and the like; acetamide-based solvents such as N,N-dimethylacetamide, N,N-diethylacetamide and the like; pyrrolidone-based solvents such as N-methyl-2-pyrrolidone, N-vinyl-2-pyrrolidone and the like may be used alone or in a mixture thereof, but not limited thereto. Also, aromatic hydrocarbons such as toluene may be further used.

The polyimide precursor obtained by the above method may be coated on one surface of a substrate, followed by imidization, curing and separation from the substrate, to prepare a polyimide film.

Specifically, the polyimide precursor composition may be in the form of a solution that the polyimide precursor is dissolved in an organic solvent. For example, in the case that the polyimide precursor is synthesized in an organic solvent, the polyimide precursor composition may be the polyimide precursor solution itself obtained after polymerization, may be further added with the same solution, or may be diluted with another solvent after polymerization.

The polyimide precursor composition preferably comprises a solid component in a content to provide a suitable viscosity in consideration of processability such as coating property in a film forming process. The solid content may range from 5 to 20 wt % based on the total weight of the polyimide precursor composition. It is preferred that the polyimide precursor composition has a viscosity of 400 to 50,000 cPs. Also, the viscosity of the polyimide precursor composition may be less than 400 cPs. If the viscosity of the polyimide precursor composition exceeds 50,000 cPs, the flexibility thereof decreases, making it difficult to be uniformly coated on the substrate and causing the process problems in the preparation of a display substrate.

Then, the polyimide precursor composition is coated on one surface of the substrate, and subject to imidization and curing at a temperature of 80 to 500° C., followed by separation from the substrate to prepare a polyimide film.

The substrate may be glass, a metallic substrate or a plastic substrate, but is not particularly limited thereto. Among these, glass may be preferably used in terms that it has good thermal and chemical stability during the imidization and curing of the polyimide precursor and it can be easily separated from the polyimide film obtained after curing without any damage.

The coating procedure may be carried out by conventional methods, specifically spin coating, bar coating, roll coating, air-knife coating, gravure coating, reverse roll coating, kiss-roll coating, doctor blade coating, spraying coating, dipping coating or brushing. Particularly, casting may be preferable in terms that it allows continuous processes and can increase the imidization rate of the polyimide film.

Also, the polyimide precursor composition may be coated in a thickness so that the final polyimide film can have a thickness suitable for a display substrate.

Specifically, it may be coated in an amount that the final polyimide film can have a thickness of 10 to 30 μm. After coating the polyimide precursor composition, prior to heat-treatment, a process of drying may be selectively carried out to remove the solvent remained in the polyimide precursor composition.

The process of drying may be carried out by conventional methods, specifically at a temperature of 140° C. or less, or 80° C. to 140° C. The drying temperature of lower than 80° C. may increase the process time, and the drying temperature of higher than 140° C. may induce sudden imidization, making it difficult to obtain the uniform thickness of the polyimide film.

Subsequently, the curing may be carried out by heat treatment at a temperature of 80 to 500° C.

Also, the curing may be carried out by heat treatment in multiple stages at the above temperature range. The curing time is not particularly limited, for example, it may range from 3 to 60 minutes.

After curing, the polyimide film may be further subject to additional heat treatment to increase the imidization rate of the polyimide, thereby providing the above-mentioned properties.

The additional heat treatment may be carried out at a temperature of 200° C. or higher, or 200 to 500° C. for 1 to 30 minutes. It may be carried out once or in multi steps of twice or more. Specifically, it may be in 3-steps including a first heat treatment at 200 to 220° C., a second heat treatment at 300 to 380° C. and a third heat treatment at 400 to 500° C. Preferably, the final curing may be carried out at a temperature of 450° C. or higher for 30 minutes.

Then, the polyimide film formed on the substrate may be detached from the substrate by conventional methods to prepare the polyimide film.

The polyimide of the present invention may have a glass transition temperature of about 360° C. or more. Thus, the polyimide having good heat-resistance can maintain such heat-resistance and good mechanical properties even though it is subject to heat treatment at a high temperature in the preparation of a device.

The polyimide of the present invention may have a thermal decomposition temperature (Td 1%), which indicates a mass reduction of 1%, of 550° C. or higher.

Also, the polyimide of the present invention has good mechanical properties. For example, it may have an elongation of 20% or more, preferably 25% or more, a tensile strength of 500 MPa or more, preferably 520 MPa or more, more preferably 530 MPa or more, and a tensile modulus of 10 GPa or more.

The present invention provides a polyimide film being end-capped with an end-capping agent comprising phthalic anhydride to have a positive value of CTE at a high temperature, thereby solving problems which may occur at a negative CTE (shrinkage behavior) at a high temperature. Also, the polyimide film of the present invention has high transparency, preferably 70% or more. Such a polyimide film allows easy preparation of a TFT device through an align key when it is used as a substrate for the display device.

The polyimide film according to the present invention can be used in various fields including a substrate for a device, a cover substrate for a display, an optical film, an integrated circuit (IC) package, an adhesive film, a multi-layered flexible printed circuit (FPC), a tape, a touch panel, a protective film for optical discs, and the like.

The present invention further provides a flexible display device comprising the polyimide film. Examples of the display device may include a liquid crystal display (LCD), an organic light emitting diode (OLED) and the like. Particularly, it is suitable for an OLED device applying a low-temperature polycrystalline silicon process which is synthesized at a high temperature, but it is not limited thereto.

Hereinafter, the present invention will be described in more detail with reference to Examples. It will be apparent to those skilled in the art that the following examples are intended to be illustrative of the present invention and not to be construed as limiting the scope of the invention.

Example 1: Polymerization of BPDA-DPDA/PA (98.9:100:2.2) for Polyamide

To a reactor subjected to nitrogen gas flow were filled 100 g of N-2-methylpyrrolidone (NMP), and 6.192 g (57.259 mmol) of p-phenylene diamine (p-PDA) was dissolved while maintaining the temperature of the reactor to 25° C. To the solution of p-PDA, 16.661 g (56.629 mmol) of 3,3',4,4'-biphenylcarboxylic dianhydride (s-BPDA) and 56.96 g of NMP were added at the same temperature, and dissolved with stirring for a predetermined period of time, to obtain a polyamic acid.

To the solution of polyamic acid obtained above, 0.187 g (1.260 mmol) of phthalic anhydride (PA) was added and stirred for a predetermined period of time, to obtain a polyimide precursor.

The polyimide precursor obtained above was added with the organic solvent so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 460° C. for 55 minutes. After curing, the glass substrate was dipped in water, and the film formed on the substrate was detached and dried at 100° C. in an oven, to prepare a 10/m-thick polyimide film.

Comparative Example 1: Polymerization of BPDA-pPDA (98.9:100) for Polyimide

To a reactor subjected to nitrogen gas flow were filled 100 g of N-methyl-2-pyrrolidone (NMP), and 6.243 g (57.726 mmol) of p-phenylene diamine (p-PDA) was dissolved while maintaining the temperature of the reactor to 25° C. To the solution of p-PDA, 16.797 g (57.091 mmol) of 3,3',4,4'-biphenylcarboxylic dianhydride (s-BPDA) and 56.96 g of NMP were added at the same temperature, and dissolved with stirring for a predetermined period of time, to obtain a polyimide precursor.

The polyimide precursor obtained above was added with the organic solvent so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 460° C. for 55 minutes. After curing, the glass substrate was dipped in water, and the film formed on the substrate was detached and dried at 100° C. in an oven, to prepare a 10/m-thick polyimide film.

Comparative Example 2: Polymerization of BPDA-PMDA-pPDA (88.9:10:100) for Polyamide To a reactor subjected to nitrogen gas flow were filled 100 g of N-methylpyrrolidone (NMP), and 6.364 g (58.849 mmol) of p-phenylene diamine (p-PDA) was dissolved while maintaining the temperature of the reactor to 25° C. To the solution of p-PDA, 15.393 g (52.316 mmol) of 3,3',4,4'-biphenylcarboxylic dianhydride (s-BPDA), 1.289 g (5.885 mmol) of pyromellitic dianhydride (PMDA) and 56.96 g of NMP were added at the same temperature, and dissolved with stirring for a predetermined period of time, to obtain a polyimide precursor.

The polyimide precursor obtained above was added with the organic solvent so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 460° C. for 55 minutes. After curing, the glass substrate was dipped in water, and the film formed on the substrate was detached and dried at 100° C. in an oven, to prepare a 10/m-thick polyimide film.

Comparative Example 3: Polymerization of BPDA-PMDA-pPDA/PA (88.9:10:100:2.2) for Polyimide To a reactor subjected to nitrogen gas flow were filled 100 g of N-methylpyrrolidone (NMP), and 6.311 g (58.363 mmol) of p-phenylene diamine (p-PDA) was dissolved while maintaining the temperature of the reactor to 25° C. To the solution of p-PDA, 15.265 g (51.885 mmol) of 3,3',4,4'-biphenylcarboxylic dianhydride (s-BPDA), 1.273 g (5.836 mmol) of pyromellitic dianhydride (PMDA) and 56.96 g of NMP were added at the same temperature, and dissolved with stirring for a predetermined period of time, to obtain a polyimide precursor. Thereto, 0.190 g (1.284 mmol) of phthalic anhydride (PA) was added and stirred for a predetermined period of time, to obtain a polyimide precursor.

The polyimide precursor obtained above was added with the organic solvent so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 460° C. for 55 minutes. After curing, the glass substrate was dipped in water, and the film formed on the substrate was detached and dried at 100° C. in an oven, to prepare a 10/m-thick polyimide film.

Experimental Example 1

The polyimide films prepared above were measured for CTE, thermal decomposition temperature, mechanical properties and transparency by the following methods, and the results are shown in Table 1.

<Coefficient of Thermal Expansion>

Each of the polyimide films prepared in Examples and Comparative Examples was cut into a size of 5 mm×16 mm, and a sample was loaded on TMA Q400 from TA Instruments using an accessory. The actual measured length of the films was 16 mm, and the force pulling the film was set to 0.02 N. A first heating process was performed within the temperature ranging from room temperature to 450° C. at a heating rate of 5° C./min and then the cooling process is performed to 50° C. at a cooling rate of 5° C./min. Then, when the cooled sample was subject to heating within the temperature ranging from 50° C. to 450° C. at a rate of 5° C./min, the change of thermal expansion was measured with TMA. The coefficients of thermal expansion at a range of 100 to 350° C. and at a range of 350 to 450° C., and then at a range of 100 to 450° C. were shown in Table 1. The dimensional change of the films prepared in Example 1 and Comparative Example 1 were shown in FIG. 1.

<Thermal Decomposition Temperature>

Each polyimide film was measured for its thermal decomposition temperature, which indicates a mass reduction of 1%, under nitrogen atmosphere using Discovery TGA (TA instruments).

<Mechanical Properties>

For measurement, 3 to 4 dumbbell-shaped specimens were prepared according to the specification of ASTM D 412. The specimens were placed on a test machine (Instron 3342B) and the distance between grips was set to 30 mm, and then measured at a rate of 10 mm/min for their elongation, tensile strength and tensile modulus.

<Transparency>

Each polyimide film was measured for transparency at a wavelength of 380 to 780 nm by JIS K 7105 using a spectrometer (8453 UV-Visible spectrophotometer, Agilent Technologies).

temperature and the CTE (A) at a low temperature satisfying the relation of 0<B/A<2 and the relation of 0<B−A<1, and good mechanical properties and high transparency, as well as a positive value of CTE at a temperature of 350° C. or higher.

In contrast, the films of Comparative Examples were confirmed to have negative values. Particularly, the film of Comparative Example 1 in which an excessive diamine was used without the addition of phthalic anhydride (PA) was confirmed to have a negative value of CTE at a temperature of 350° C. or higher, and the films of Comparative Examples 2 and 3, which had the skeleton of BPDA-PMDA-pPDA, were confirmed to have a negative value of CTE at a temperature of 350° C. or higher, which mean their heat-resistance to be reduced by the addition of PMDA. Particularly, the film of Comparative Example 3 was end-capped with PA, but had reduced heat-resistance by the addition of PMDA. Also, the films of Comparative Examples 2 and 3 had poor transparency as compared with the polyimide film of the present invention.

Thus, the present invention provides a polyimide film which can maintain good mechanical properties induced from the use of an excessive diamine in the preparation thereof, and inhibit the shrinkage behavior of CTE at a high temperature to improve heat-resistance, as well as have enhanced transparency to exhibit transparent and durable characteristics.

While the present invention has been particularly shown and described with reference to FIGURES and embodiments thereof, it will be understood by those of ordinary skill in the art that the scope of the present invention is not limited thereby and that various changes and modifications may be made therein. Therefore, the actual scope of the present invention will be defined by the appended claims and their equivalents.

What is claimed is:

1. A polyimide film, comprising:
   a cured polyimide, wherein the polyimide is prepared by polymerizing less than 1 mol of 3,3',4,4'-biphenylcarboxylic dianhydride (s-BPDA) with respect to 1 mol of 4,4'-paraphenylenediamine (pPDA), and end-capping with addition of an end-capping agent comprising phthalic anhydride (PA),

TABLE 1

| | | Unit | Example 1 | Com. Example 1 | Com. Example 2 | Com. Example 3 |
|---|---|---|---|---|---|---|
| Film Thickness | | μm | 10 | 10 | 10 | 10 |
| Thermal Properties | CTE 100~350° C. (A) | ppm/° C. | 2.1 | 1.8 | 7.3 | 2.8 |
| | CTE 350~450° C. (B) | ppm/° C. | 2.8 | −3.1 | −15.7 | −9.8 |
| | A/B | | | 0.75 | −0.58 | −0.46 | −0.28 |
| | B/A | | | 1.33 | −1.72 | −2.15 | −3.5 |
| | B − A | ppm/° C. | 0.7 | −4.9 | −23 | −12.6 |
| | Td_1% | ° C. | 571 | 571 | 559 | 559 |
| Mechanical Properties | Elongation | % | 28 | 28 | 37 | 40 |
| | Tensile Strength | MPa | 530 | 520 | 402 | 420 |
| | Tensile Modulus | GPa | 10.4 | 10.1 | 9.2 | 9.4 |
| Transparency | $T_{avar.}$ @ 380~780 nm | % | 70 | 61 | 55 | 60 |

From Table 1 and FIG. 1, the polyimide film of the present invention was confirmed to have the CTE (B) at a high wherein an amount of the end-capping agent comprising PA is 0.02 to 0.025 mol based on 1 mol of pPDA, wherein the polyimide film has a positive value of coefficient of thermal expansion at a temperature ranging from 350° C. or higher as measured by the thermomechanical analyzer, and wherein the polyimide film has a coefficient of thermal expansion at a range of 100 to 350° C. (A) and a coefficient of thermal expansion at a range of 350 to 450° C. (B), wherein A and B as measured by a thermomechanical analyzer satisfy equation 1:

$$0<B/A<2 \qquad \text{[Equation 1]}.$$

2. The polyimide film of claim 1, wherein the coefficient of thermal expansion at a range of 100 to 350° C. (A) and the coefficient of thermal expansion at a range of 350 to 450° C. (B) satisfy equation 2:

$$0<B-A<1 \qquad \text{[Equation 2]}.$$

3. The polyimide film of claim 1, comprising a cured product of a polyimide precursor solution, the curing being carried out at a final curing temperature of 450° C. or higher.

4. The polyimide film of claim 1, wherein a molar ratio of 3,3',4,4'-biphenylcarboxylic dianhydride (s-BPDA) and 4,4'-paraphenylenediamine (pPDA) ranges from 0.98:1 to 0.99:1.

5. The polyimide film of claim 1, which has a transparency of 70% or more.

6. The polyimide film of claim 1, wherein the end-capping agent comprising PA is added in an amount of 0.022 to 0.025 mol based on 1 mol of pPDA.

7. The polyimide film of claim 1, which has a Coefficient of thermal expansion of 0 to 7 ppm/° C. as measured upon a second heating of the polyimide film from 50° C. to 450° C., after a first heating and cooling to 50° C. thereof, the first heating and cooling being performed by heating the polyimide film from room temperature to 450° C. and then cooling to 50° C.

8. A method of preparing a polyimide film for a flexible display device substrate, comprising:

adding polymeric components comprising less than 1 mol of 3,3',4,4'-biphenylcarboxylic dianhydride (s-BPDA) with respect to 1 mol 4,4'-paraphenylenediamine (pPDA), and an end-capping agent comprising phthalic anhydride (PA) to a polymerization solvent to prepare a polyimide precursor;

dissolving the polyimide precursor in an organic solvent to obtain a polyimide precursor solution;

coating the polyimide precursor solution on a substrate; and curing the coating of the polyimide precursor solution by drying and heating thereof to prepare the polyimide film, wherein an amount of the end-capping agent comprising PA is 0.02 to 0.025 mol based on 1 mol of pPDA.

9. The method of claim 8, wherein the curing of the coating of the polyimide precursor solution is completed at a temperature of 450° C. or higher.

10. A flexible display device comprising the polyimide film of claim 1 as a display substrate.

* * * * *